US011478933B2

(12) United States Patent
Katsunuma et al.

(10) Patent No.: US 11,478,933 B2
(45) Date of Patent: Oct. 25, 2022

(54) EQUIPMENT STATUS ESTIMATION METHOD AND SYSTEM

(71) Applicant: Hitachi, Ltd., Tokyo (JP)

(72) Inventors: Satoshi Katsunuma, Santa Clara, CA (US); Michiko Yoshida, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 652 days.

(21) Appl. No.: 16/436,678

(22) Filed: Jun. 10, 2019

(65) Prior Publication Data

US 2020/0384648 A1 Dec. 10, 2020

(51) Int. Cl.
*B25J 9/16* (2006.01)
*B25J 9/00* (2006.01)
*G05B 19/418* (2006.01)

(52) U.S. Cl.
CPC ............ *B25J 9/1674* (2013.01); *B25J 9/0084* (2013.01); *G05B 19/4184* (2013.01); *G05B 2219/31356* (2013.01); *G05B 2219/31383* (2013.01); *Y02P 90/02* (2015.11)

(58) Field of Classification Search
CPC .................. B25J 9/1674; B25J 9/0084; G05B 2219/31356; G05B 19/4184; G05B 2219/31383; Y02P 90/02
See application file for complete search history.

(56) References Cited

U.S. PATENT DOCUMENTS

2004/0148047 A1* 7/2004 Dismukes ............. G06Q 10/06 700/100
2015/0244775 A1* 8/2015 Vibhor .................. G06Q 10/06 709/203
2020/0058081 A1* 2/2020 Saneyoshi ............. G06Q 50/04

OTHER PUBLICATIONS

Nagi et al. (Throughput Rate Improvement in a Multiproduct Assembly Line Using Lean and Simulation Modeling and Analysis, vol. 11, 2017, pp. 593-601, ISSN 2351-9789) (Year: 2017).*
Yazdi et al. (An Empirical Investigation of the Relationship between Overall Equipment Efficiency (OEE) and Manufacturing Sustainability in Industry 4.0 with Time Study Approach. Sustainability. 10. 10.3390/su10093031. Aug. 2018) (Year: 2018).*
Koltai et al. (Calculation of the Throughput-Time in Simple Assembly Lines with Learning Effect, IFAC-PapersOnLine, vol. 48, Issue 3, 2015, pp. 314-319, ISSN 2405-8963, https://doi.org/10.1016/j.ifacol.2015.06.100.) (Year: 2015).*
Breginski et al. (Assembly line balancing using eight heuristics. 22nd International Conference on Production Research, ICPR 2013) (Year: 2013).*

* cited by examiner

*Primary Examiner* — Daniel R Miller
*Assistant Examiner* — Christian T Bryant
(74) *Attorney, Agent, or Firm* — Procopio, Cory, Hargreaves & Savitch LLP

(57) ABSTRACT

Example implementations described herein estimate parameters for equipment that cannot be sensed directly, including determining if such equipment is running or stopping. Example implementations determine the standard throughput per equipment and product, based on history of equipment production data, extract previous and next equipment of robotic arms on the line by using physical topology information of robot arms and equipment, senses and determines throughput of associated robot arms and compares the robot arm throughput with the standard throughputs of the previous and next equipment, which help determine whether the previous/next equipment have stopped.

17 Claims, 25 Drawing Sheets

| Time (301) | Equipment id (302) | Production id (303) | Count (304) | Idling time (305) | Ref. |
|---|---|---|---|---|---|
| 2/1/2019 9:00AM -10:00AM | #B | #x | 500 | 10min | 306 |
| 2/1/2019 10:00AM -11:00AM | #B | #y | 400 | 10min | 307 |
| 2/1/2019 10:00AM -11:00AM | #B | #x<br>#y | 200<br>300 | 10min | 308 |
| 2/1/2019 12:00PM -1:00PM | #B | #y | 440 | 10min | 309 |
| 2/1/2019 1:00PM -2:00PM | #B | #x<br>#y | 300<br>200 | 10min | 310 |
| 2/1/2019 2:00PM -3:00PM | #B | #x | 600 | 10min | 311 |

| Equipment id | Product id | Equipment standard throughput | |
|---|---|---|---|
| #A | #x | 20/min | 404 |
| #A | #y | 30/min | 405 |
| #A | #z | 100/min | 406 |
| #B | #x | 11/min | 407 |
| #B | #y | 7/min | 408 |
| #B | #z | 110/min | 409 |
| #C | #x | 6/min | 410 |
| #C | #y | 6/min | 411 |
| #C | #z | 50/min | 412 |
| #D | #x | 30/min | 413 |
| #D | #y | 5/min | 414 |
| #D | #z | 30/min | 415 |

FIG. 5

| Line id (501) | Object id (502) | Type (503) | Prev (504) | Next (505) | |
|---|---|---|---|---|---|
| #L1 | #1 | Robot arm | - | #A | 506 |
| #L1 | #A | Equipment | #1 | #2 | 507 |
| #L1 | #2 | Robot arm | #A | #B, #C | 508 |
| #L1 | #B | Equipment | #2 | #3 | 509 |
| #L1 | #C | Equipment | #2 | #3 | 510 |
| #L1 | #3 | Robot arm | #B, #C | #D | 511 |
| #L1 | #D | Equipment | #3 | #4 | 512 |
| #L1 | #4 | Robot arm | #3 | - | 513 |

FIG. 6

| Time (601) | Line id (602) | Product id (603) | Loading/unloading (604) | Number (605) |
|---|---|---|---|---|
| 2/22/2019 9:30AM | #L1 | #x | loading | 1000 |
| 2/22/2019 9:30AM | #L1 | #y | loading | 1000 |

606 (first data row), 607 (second data row)

FIG. 7

| Time | Robotic arm id | Count |
|---|---|---|
| 2/22/2019 10:00AM | #1 | 20/min |
| 2/22/2019 10:00AM | #2 | 10/min |
| 2/22/2019 10:00AM | #3 | 4/min |
| 2/22/2019 10:00AM | #4 | 4/min |

| Time | Equipment id | Status |
|---|---|---|
| 2/22/2019 10:00AM | #C | Idiling |

| Equipment | Product | Robotic arm Standard Throughput |
|---|---|---|
| #A | #x | 20/min |
| #A | #y | 30/min |
| #B + #C | #x, #x | 17/min |
| #B + #C | #x, #y | 17/min |
| #B + #C | #y, #x | 13/min |
| #B + #C | #y, #y | 13/min |
| #B | #x | 11/min |
| #B | #y | 7/min |
| #C | #x | 6/min |
| #C | #y | 6/min |

⇨ #C is idling

| Equipment | Product | Robotic arm Standard Throughput |
|---|---|---|
| #B + #C | #x, #x | 17/min |
| #B + #C | #x, #y | 17/min |
| #B + #C | #y, #x | 13/min |
| #B + #C | #y, #y | 13/min |
| #B | #x | 11/min |
| #B | #y | 7/min |
| #C | #x | 6/min |
| #C | #y | 6/min |
| #D | #x | 30/min |
| #D | #y | 5/min |

Not detecting idling 801 802 803

| Time | Equipment id | Status |
|---|---|---|
| 2/22/2019 10:00AM | #C | running |

| Equipment | Product | Robotic arm Standard Throughput |
|---|---|---|
| #A | #x | 20/min |
| #A | #y | 30/min |
| #B + #C | #x, #x | 17/min |
| #B + #C | #x, #y | 17/min |
| #B + #C | #y, #x | 13/min |
| #B + #C | #y, #y | 13/min |
| #B | #x | 11/min |
| #B | #y | 7/min |
| #C | #x | 6/min |
| #C | #y | 6/min |

Not detecting idling

| Time (2100) | Equipment id (2101) | Status (2102) | Product id (2103) | |
|---|---|---|---|---|
| 2/1/2019 10:00AM | #A | running | #x | 2104 |
| 2/1/2019 10:00AM | #B | running | #x | 2105 |
| 2/1/2019 10:00AM | #C | idling | - | 2106 |
| 2/1/2019 11:00AM | #B | running | #y | 2107 |
| 2/1/2019 12:00PM | #B | idling | - | 2108 |
| 2/1/2019 1:00PM | #B | idling | - | 2109 |

FIG. 21

| Robotic Arm id (2201) | Prev running Equipment ids (2202) | Prev running Equipment Product ids (2203) | Next running Equipment ids (2204) | Next running equipment Products (2205) | Standard Robot arm Throughput (2206) |
|---|---|---|---|---|---|
| #2 | #A | #x | #B + #C | #x, #x | 17/min |
| #2 | #A | #x | #B + #C | #x, #y | 17/min |
| #2 | #A | #x | #B + #C | #y, #x | 13/min |
| #2 | #A | #x | #B + #C | #y, #y | 13/min |
| #2 | #A | #x | #B | #x | 11/min |
| #2 | #A | #x | #B | #y | 7/min |
| #2 | #A | #x | #C | #x | 6/min |
| #2 | #A | #x | #C | #y | 6/min |

EQUIPMENT STATUS ESTIMATION METHOD AND SYSTEM

BACKGROUND

Field

The present disclosure is generally directed to equipment management systems, and more specifically, to equipment status estimation methods and systems.

Related Art

In factories, there can be numerous equipment in operation, and it is necessary to monitor the equipment and in particular, monitor the status of equipment such as whether they are running or stopping to keep their production efficiency.

In a related art system, there are systems and methods to calculate productivity metrics (availability/quality/performance/OEE) of Unit Production Processes (UPPs), the sub-systems, and the systems. Each UPP has downtime, actual count, bad count, average arrival/departure rate, and average number of input/output buffer. Related art systems also include the topology information of UPPs, and calculates metrics of a UPP as well as combinations of UPPs.

SUMMARY

However, the related art systems cannot calculate the status of equipment that is not sensed directly from the line. In an example, there can be a line that involves equipment that is not sensed such as a line having non-sensed equipment as well as sensed robotic arms. There can be a line that includes branches and merges between equipment and robotic arms. There can be a line that produces different products at the same time, wherein the processing time is different per product.

In such situations, the related art cannot determine the status of equipment that cannot be sensed directly from the line, because the throughput of each such equipment cannot be estimated by the throughput of robotic arms between the equipment.

Aspects of the present disclosure involve a method, which can involve determining a throughput of a robotic arm; determining an equipment and product pair from one or more equipment and product pairs associated with the robotic arm based on comparing the throughput to a standard throughput of the robotic arm for the one or more equipment and product pairs; and identifying idle equipment from the determined equipment and product pair and a topology of the robotic arm.

Aspects of the present disclosure involve a system, which can involve means for determining a throughput of a robotic arm; means for determining an equipment and product pair from one or more equipment and product pairs associated with the robotic arm based on comparing the throughput to a standard throughput of the robotic arm for the one or more equipment and product pairs; and means for identifying idle equipment from the determined equipment and product pair and a topology of the robotic arm.

Aspects of the present disclosure involve a computer program, storing instructions for executing a process, the instructions involving determining a throughput of a robotic arm; determining an equipment and product pair from one or more equipment and product pairs associated with the robotic arm based on comparing the throughput to a standard throughput of the robotic arm for the one or more equipment and product pairs; and identifying idle equipment from the determined equipment and product pair and a topology of the robotic arm. The computer program can be stored in a non-transitory computer readable medium and configured to be executed by one or more processors.

Aspects of the present disclosure can involve a server connected to one or more programmable logic controllers (PLCs) associated with a robotic arm over a network, and wherein equipment associated with the robotic arm is isolated from the network, the server involving a processor, configured to determine a throughput of a robotic arm; determine an equipment and product pair from one or more equipment and product pairs associated with the robotic arm based on comparing the throughput to a standard throughput of the robotic arm for the one or more equipment and product pairs; and identify idle equipment from the determined equipment and product pair and a topology of the robotic arm.

BRIEF DESCRIPTION OF DRAWINGS

FIG. 4 illustrates an equipment production data table, in accordance with an example implementation.

FIG. 5 illustrates an equipment-product standard throughput table, in accordance with an example implementation.

FIG. 6 illustrates an equipment and robotic arms topology table, in accordance with an example implementation.

FIG. 7 illustrates a loading and unloading product data table, in accordance with an example implementation.

FIG. 8 illustrates a robotic arm sensing data table, in accordance with an example implementation.

FIG. 9 illustrates an equipment status table, in accordance with an example implementation.

FIG. 16 illustrates an example of the camera image analytics result table, in accordance with a second example implementation.

FIG. 21 illustrates an equipment production snapshot data table, in accordance with a third example implementation.

FIG. 22 illustrates the robotic arm-product standard throughput table, in accordance with a third example implementation.

DETAILED DESCRIPTION

Figure 1:
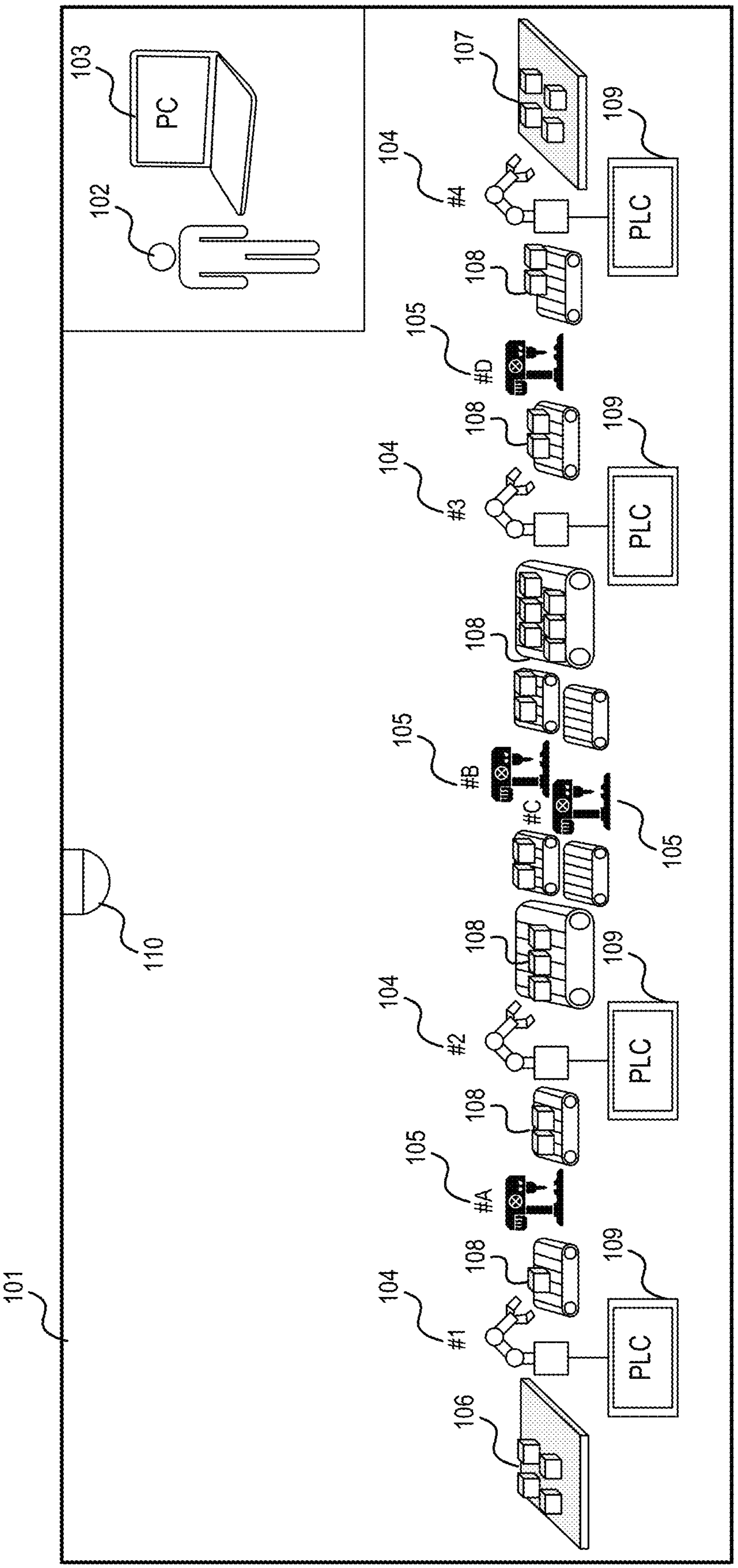
FIG. 1 illustrates an example physical structure of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In a first example implementation, systems and methods described herein are directed to estimating idling status of equipment that is not sensed directly in online. The first example implementation calculates standard throughput per equipment and product, based on history of equipment production data. The first example implementation extracts previous and next equipment of robotic arms by using physical topology information of robot arms and equipment. The first example implementation calculates the throughput of a robot arm by using the sensing data of the robotic arm, and then it compares the throughput with the standard throughputs of the previous and next equipment. Then, the first example implementation determines which of the previous/next equipment has stopped.

FIG. 1 illustrates an example physical structure of the system, in accordance with an example implementation. In a factory 101, there are lines including equipment 105, and robotic arms 104. Such lines can involve there can be branches and merges between the equipment 105 and robotic arm(s) 104. Equipment 105 processes products 108 and robotic arms 104 carry products 108. Multiple kinds or types of products may be processed at the same time, depending on the desired implementation. Robotic arms 104 are controlled by Programmable Logic Controllers (PLCs) 109. Workers 102 input history of equipment 105 status and register it in a personal computer (PC) 103 which will be sent to a server. In lines, loading products 106 and unloading products 107 are managed by production management systems, in accordance with an example implementation. Depending on the desired implementation, a camera system 110 may also monitor the factory floor 101.

Figure 2:
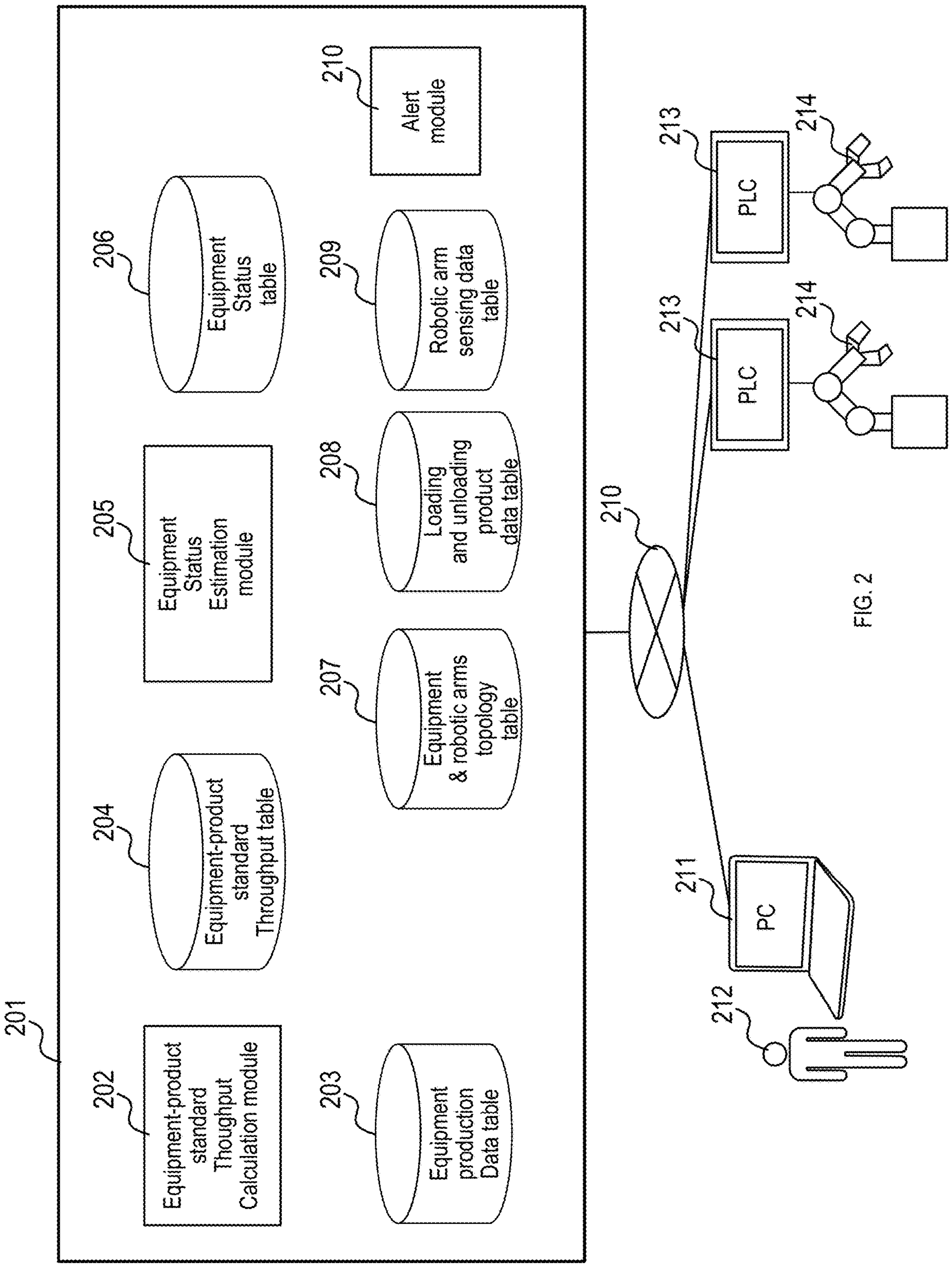
FIG. 2 illustrates a system configuration, in accordance with an example implementation.

FIG. 2 illustrates a system configuration, in accordance with an example implementation. Server 201 is connected to the PLCs 213 and the PC 211 via network 210. In the server 201, there can be an equipment production data table 203, the equipment-product standard throughput calculation module 202, the equipment-product standard throughput table 204, equipment & robotic arms topology table 207, loading and unloading product data table 208, robotic arm sensing data table 209, the equipment status estimation module 205, and the equipment status table 206. Depending on the desired implementation, there can be an alert module 210 that is configured to engage an Andon of the factory floor or send messages to workers on the line upon the detection of an arm or equipment going offline. The PLCs 213 control robotic arms 214 and retrieve sensing data from robotic arms 214. Workers 212 input equipment production data to the PC 211.

Figure 3:
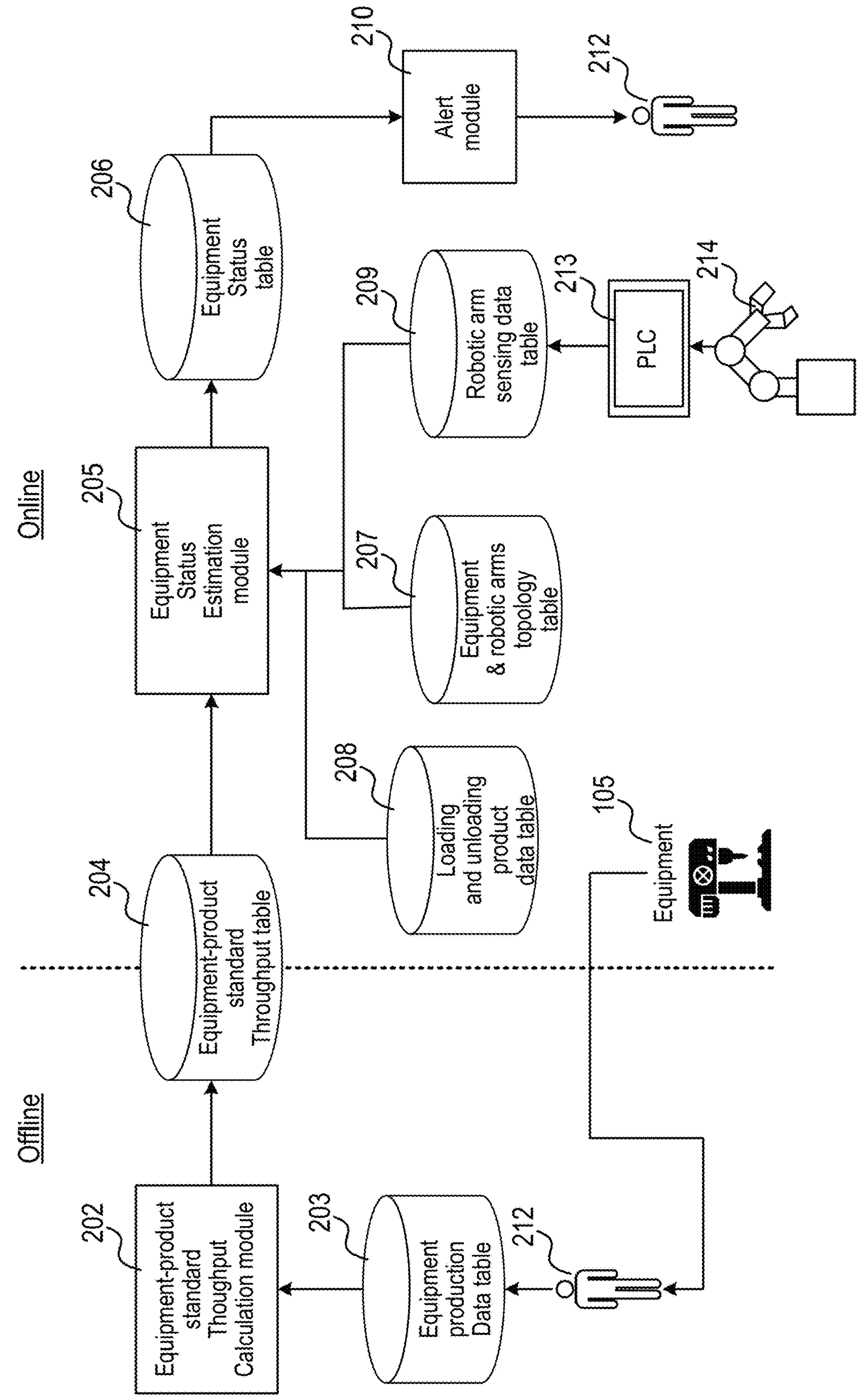
FIG. 3 illustrates the input and output relation of modules and tables, in accordance with an example implementation.

FIG. 3 illustrates the input and output relation of modules and tables, in accordance with an example implementation. As equipment 105 is not networked directly to the management server, worker 212 observes equipment 105 and provides the observations to the equipment production data table 203 through their corresponding personal computer. Periodically, equipment product standard throughput calculation module 202 will intake data from the equipment production data table 203 and provide the results to the equipment-product standard throughput table 204. The equipment status estimation module 205 determines the status of the equipment based on data received from loading and unloading product table 208, equipment and robotic arms topology table 207, and robotic arm sensing data table 209 to provide equipment status into equipment status table 206. If an alert needs to braised about an equipment or robotic arm going offline, then a message is sent to alert module 210 to send an alert to the worker 212.

FIG. 4 illustrates an equipment production data table, in accordance with an example implementation. The equipment production data table stores historical production data from each equipment. The historical production data is registered by workers, and the data is used for calculating equipment-product standard throughput by the equipment-product standard throughput calculation module. The information can include a time stamp 301, an equipment identifier (ID) 302, a production ID 303, a production count 304, and idling time 305. Entries 306, 307, 308, 309, 310, and 311 indicate entries registered by the worker for an equipment. For example, entry 310 indicates that at the time 1:00 PM to 2:00 PM on Feb. 1, 2019, equipment #B conducted production for product #x and produced 300 units, and produced 200 units for product #y, and idled for 10 minutes during this time.

FIG. 5 illustrates an equipment-product standard throughput table, in accordance with an example implementation. Specifically, this table stores standard throughput per equipment and production. The standard throughput is stored by the equipment-product standard throughput calculation module. The standard throughput is used to estimate equipment's idling status by the Equipment Status Estimation Module. The information can include the equipment ID 401, the product ID 402, and the equipment standard throughput 403.

Entries 404, 405, 406, 407, 408, 409, 410, 411, 412, 413, 414 and 415 are provided from the equipment-product standard throughput calculation module. For example, entry 404 indicates that equipment #A producing product #x has a standard throughput of 20 units per minute.

FIG. 6 illustrates an equipment and robotic arms topology table, in accordance with an example implementation. This table stores the physical relation of equipment and robotic arms. The physical relation is defined in advance by manual entry or by the management systems in accordance with the desired implementation. The physical relation is used to extract previous and next equipment of robotic arms for estimating the idling status of an equipment by the equipment status estimation module. The information that can be included in this table can involve line ID 501, Object ID 502, the apparatus type 503, the previous apparatus 504 in the line and the next apparatus 505 on the line. The object IDs 502 encompass IDs of equipment and robotic arms. Entries 506, 507, 508, 509, 510, 511, 512 and 513 indicate the topology of a particular object. For example, entry 507 indicates that object #A is an equipment on line L#1 that operates after receiving a unit from object ID #1 and provides the unit to object ID #2 after processing.

FIG. 7 illustrates a loading and unloading product data table, in accordance with an example implementation. The table stores loaded and unloaded products and the numbers in lines.

The data is retrieved from production management systems, and is used to estimate idling status for an equipment by the Equipment Status Estimation Module. The information can include a timestamp 601, the line ID 602, the product ID 603, indication if the process is loading/unloading 604, and the number of unit 605. Entries 606 and 607 indicate the loading/unloading process for a given time. For example, entry 606 indicates that at time stamp 9:30 AM on Feb. 22, 2019, Line #L1 conducting the loading of 1000 units of product #x.

FIG. 8 illustrates a robotic arm sensing data table, in accordance with an example implementation. The table stores product counts of robotic arms. The count data is retrieved from PLCs corresponding to the robotic arms, and is updated online. The count data is used to estimate idling status of the equipment by the equipment status estimation module. The information can involve timestamp 701, the robotic arm ID 702, and the count of units done per time 703. Entries 704, 705, 706, and 707 indicate the measurement for a given robotic arm. For example, entry 704 indicates that at time 10:00 AM on Feb. 22, 2019, robotic arm #1 operated at 20 units per minute.

FIG. 9 illustrates an equipment status table, in accordance with an example implementation. The table stores the idling status of each equipment as generated by the equipment status estimation module. Such information can involve the timestamp 801, the equipment ID 802 and the status 803. In an example entry 804, at time 10:00 AM on Feb. 22, 2019, equipment #C had an idling status.

Figure 10:
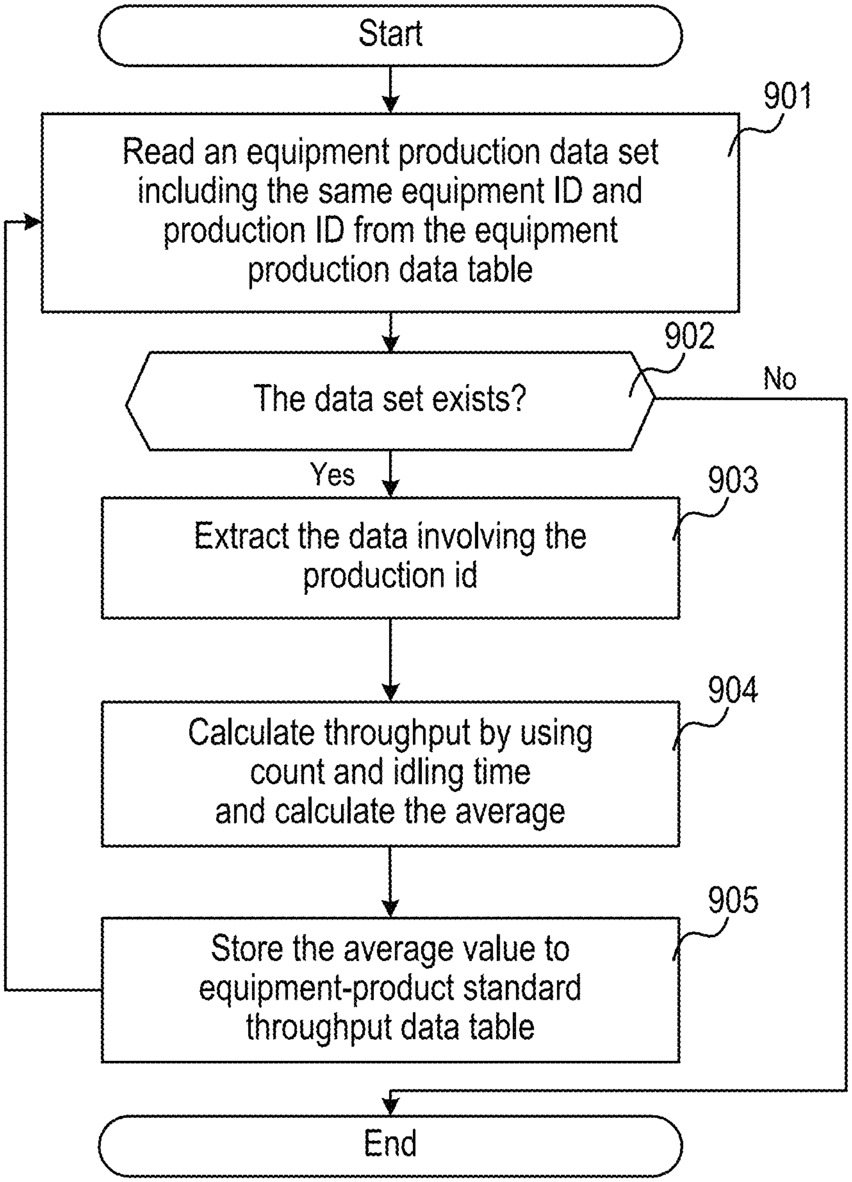
FIG. 10 illustrates a flowchart of an equipment-product standard throughput calculation module, in accordance with an example implementation.

FIG. 10 illustrates a flowchart of an equipment-product standard throughput calculation module, in accordance with an example implementation. This module calculates the standard throughputs per equipment and product, based on the equipment production data. This module also reads the equipment production data table and stores the standard throughputs to the equipment-product standard throughput data table. At 901, the module reads an equipment production data set including the same equipment ID and production ID from the equipment production data table. At 902, a determination is made as to whether the data set exists. If not (No), then the process ends, otherwise (Yes), the process proceeds to 903 to extract the data involving the production ID. At 904, the module calculates the throughput by using the count and idling time, and calculates the average of the determined throughput values. At 905, the module stores the average value to the equipment-product standard throughput data table.

Figure 11:
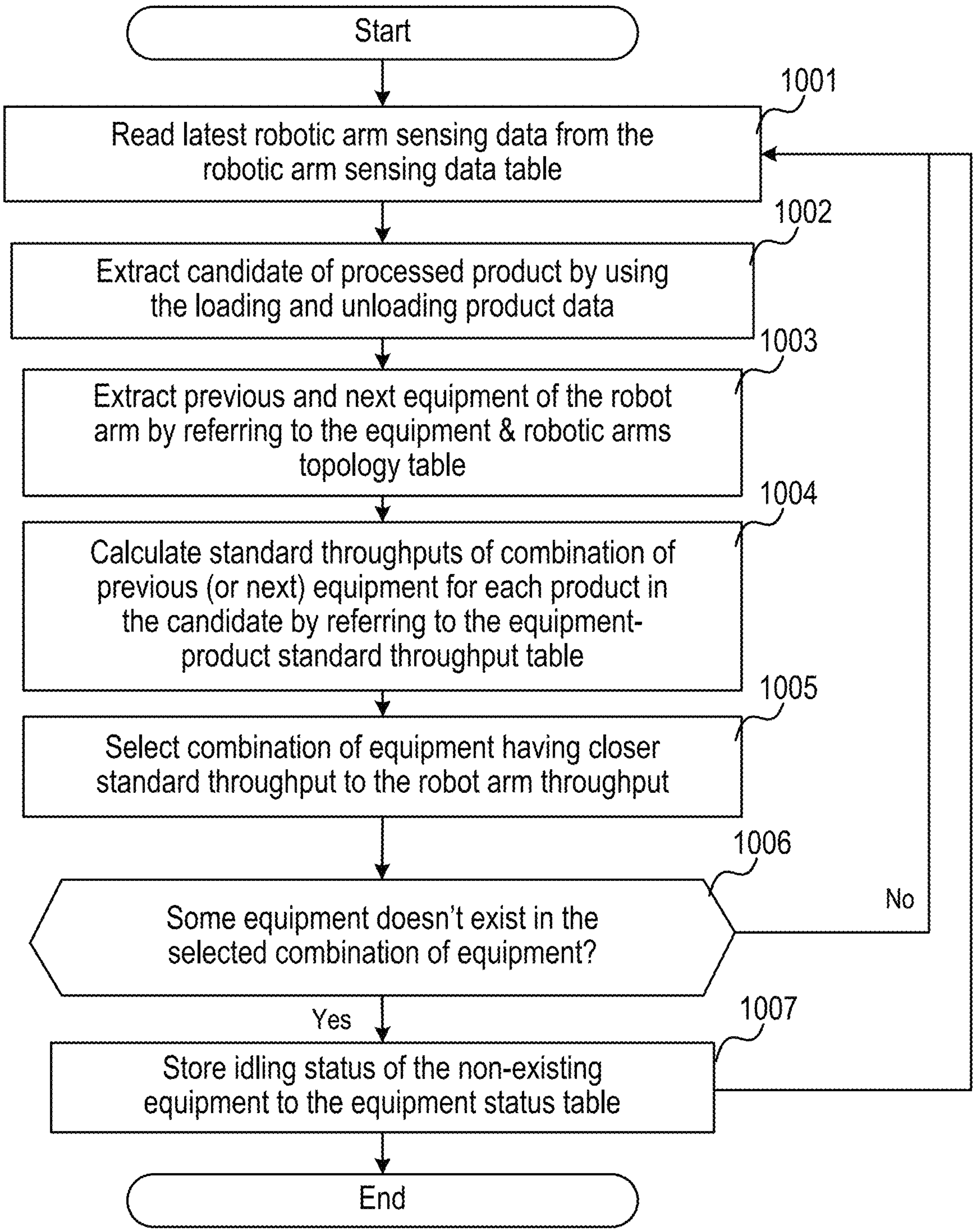
FIG. 11 illustrates an example flow diagram for the equipment status estimation module, in accordance with an example implementation.

FIG. 11 illustrates an example flow diagram for the equipment status estimation module, in accordance with an example implementation. This module estimates idling status of equipment. This module reads the robotic arm sensing data table, the loading and unloading product data, the equipment and robotic arms topology table, and the equipment-product standard throughput table, and stores the estimated idling status of equipment to the equipment status table.

At 1001, the module reads the latest robotic arm sensing data from the robotic arm sensing data table. At 1002, the module extracts candidates of the processed product by using the loading and unloading product data. At 1003, the module extracts the previous and next equipment of the robot arm by referring to the equipment and robotic arms topology table. At 1004, the module calculates the standard throughputs for the combination of the previous (or next) equipment for each product in the candidate by referring to the equipment-product standard throughput table. At 1005, the module selects the combination of equipment having the closest standard throughput to the robot arm throughput. At 1006, a determination is made as to whether some equipment does not exist in the selected combination of equipment. If so (Yes) then the flow proceeds to 1007 to store the idling status of the non-existing equipment to the equipment status table, otherwise (No) the flow proceeds to 1001.

Figure 12:
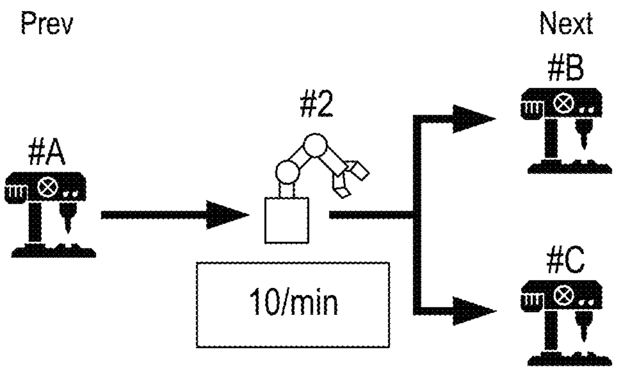
FIG. 12 illustrates an example description diagram of equipment status estimation for a branching situation, in accordance with an example implementation.

FIG. 12 illustrates an example description diagram of equipment status estimation for a branching situation, in accordance with an example implementation. In this example, the previous equipment of robotic arm #2 is #A and next equipment are #B, #C, and possible processing products are #x, #y, the module calculates the robotic arm standard throughputs of each equipment set and product according to the flow diagram of FIG. 11. In this case, since the measured throughput of robotic arm #2 is 10/min, the robotic arm standard throughput of the equipment B and the product #x (11/min) is determined to be the closest throughput to the measured throughput. From this determination, the measured throughput of robotic arm #2 thereby depends on the throughput of the equipment B, and then it is estimated that equipment #C is idling.

Figure 13:
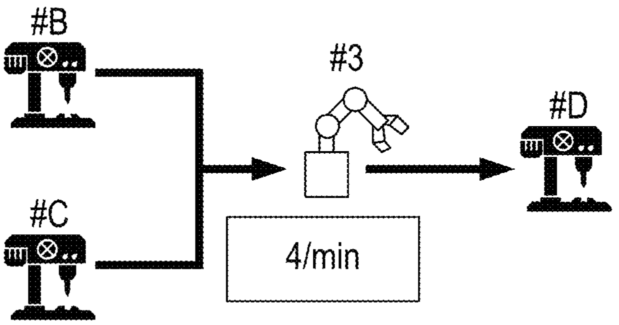
FIG. 13 illustrates the description diagram of equipment status estimation in a merging situation, in accordance with an example implementation.

FIG. 13 illustrates the description diagram of equipment status estimation in a merging situation, in accordance with an example implementation. In this example, the previous equipment of robotic arm #3 is #B and #C, and the next equipment is #D, wherein the possible processing products are #x, #y. For this example, the module calculates robotic arm standard throughputs of each equipment set and product through the use of the flow of FIG. 11. In this case, since the measured throughput of robotic arm #3 is 4/min, the robotic arm standard throughput of the equipment #D and the product #y (5/min) is determined to be the closest throughput to the measured throughput. Accordingly, the measured throughput of robotic arm #3 depends on the throughput of the equipment #D, and thus, the idling of equipment is not detected.

The first example implementation thereby detects running status of equipment that cannot be sensed directly in the lines that include branching and merging arrangements, and that process multiple products at the same time.

In a second example implementation, there are sensors such as cameras that capture images of the factory floor, wherein analytics such as image analytics are utilized in detecting the running status of the underlying equipment captured in the images. The running status is utilized as a constraint condition when estimating equipment status. The image analytics can be conducted in any method in accordance with the desired implementation that can detect whether equipment identified in the images of the camera are running or not. Example implementations utilize the results of such image analytics with the throughput detection as described herein to determine if equipment is actually idle or not. Although the example implementations described herein involve cameras and image analytics, one of ordinary skill in the art can utilize the example implementations described herein to be extended to other sensors (e.g., sound sensors, vibration sensors, current flow sensors, etc.) with the appropriate analytics in accordance with the desired implementation.

Figure 14:
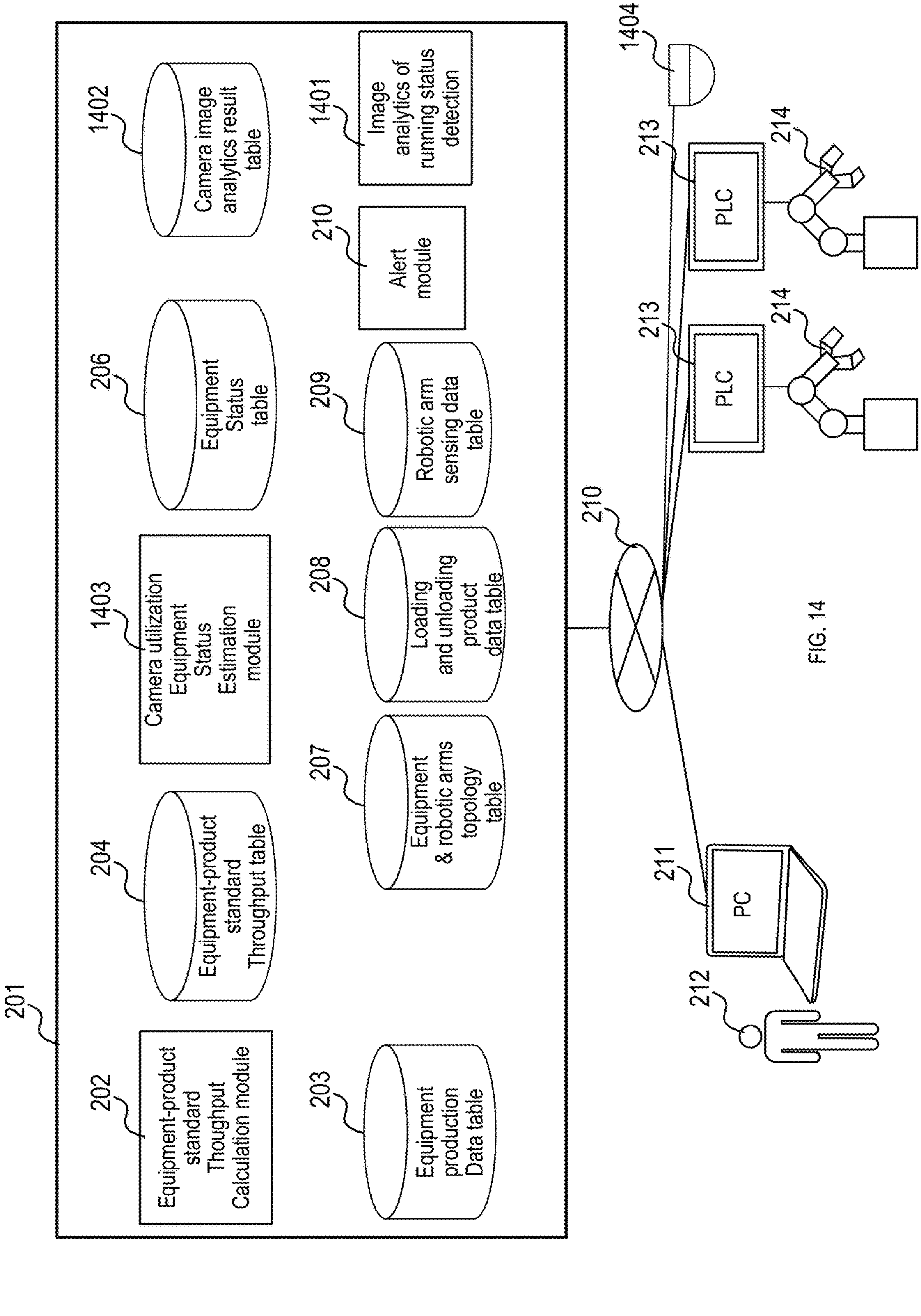
FIG. 14 illustrates an example system configuration in accordance with the second example implementation.

FIG. 14 illustrates an example system configuration in accordance with the second example implementation. In this example implementation, cameras 1404 are connected to the network 210. Further, image analytics module of running status detection 1404, camera utilization equipment status estimation module 1403, and camera image analytics result table 1402 are added in comparison to the first example implementation.

Figure 15:
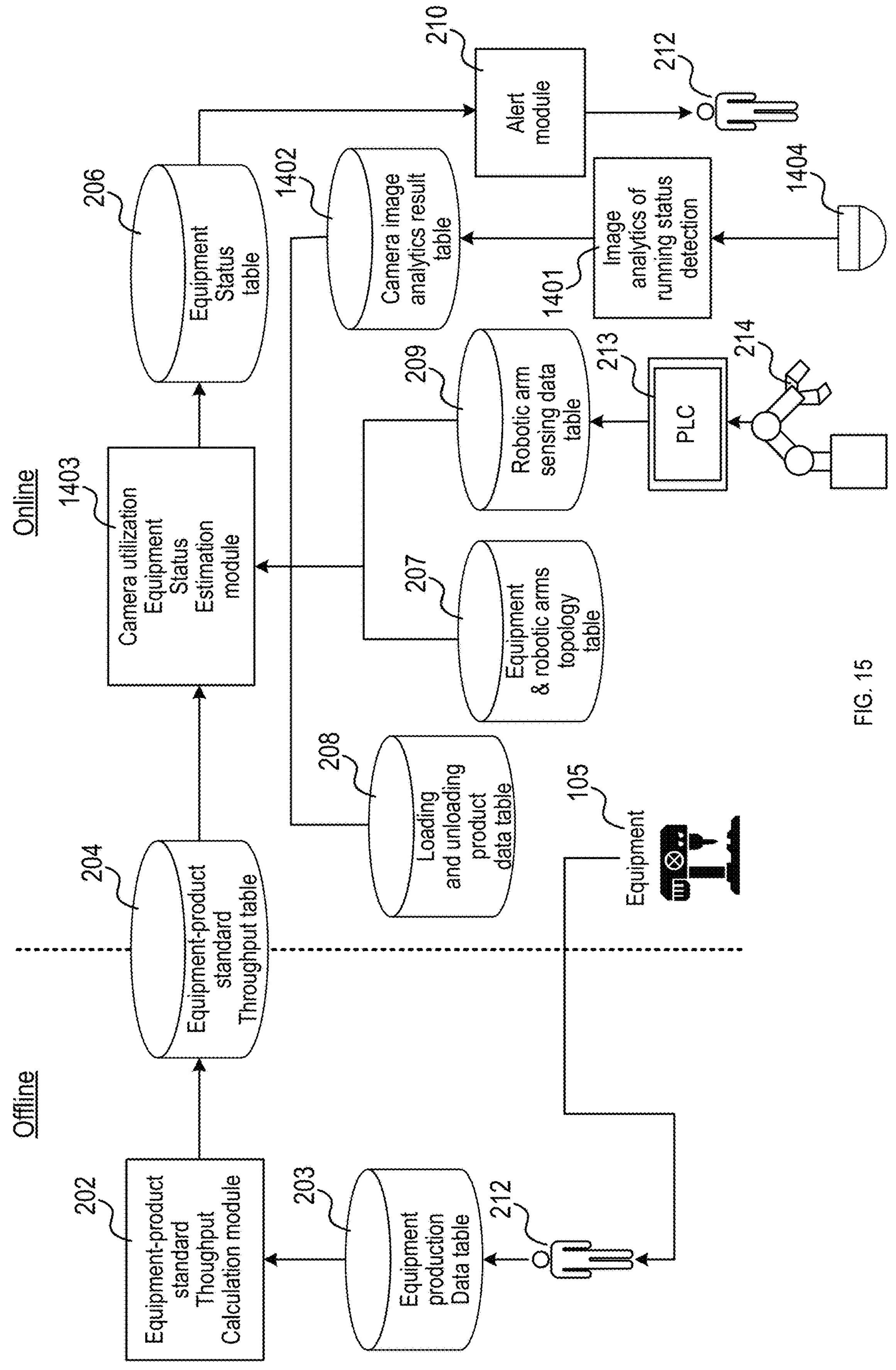
FIG. 15 illustrates an example of input and output relations of modules and tables in accordance with a second example implementation.

FIG. 15 illustrates an example of input and output relations of modules and tables in accordance with a second example implementation. As illustrated in FIG. 15, the flow is similar to that of the first example implementation, only that cameras 1404 provide images to the image analytics of running status detection module 1401. The resultant analytics of the module is provided to the camera image analytics result table 1402. The results of the camera image analytics result table 1402 are utilized with robotic arm sensing data table 209, equipment and robotic arms topology table 207, and loading and unloading product data table 208 in the camera utilization equipment status estimation module 1403.

FIG. 16 illustrates an example of the camera image analytics result table, in accordance with a second example implementation. Upon conducting the image analytics, the results of the image analytics are stored as shown in FIG. 16, the information of which can include time stamp 801, equipment ID 802 and status 803. For example, entry 804 indicates that analytics conducted on images at time 10:00 AM on Feb. 22, 2019 involved equipment ID #C, wherein the image analytics indicated that the equipment was running.

Figure 17:
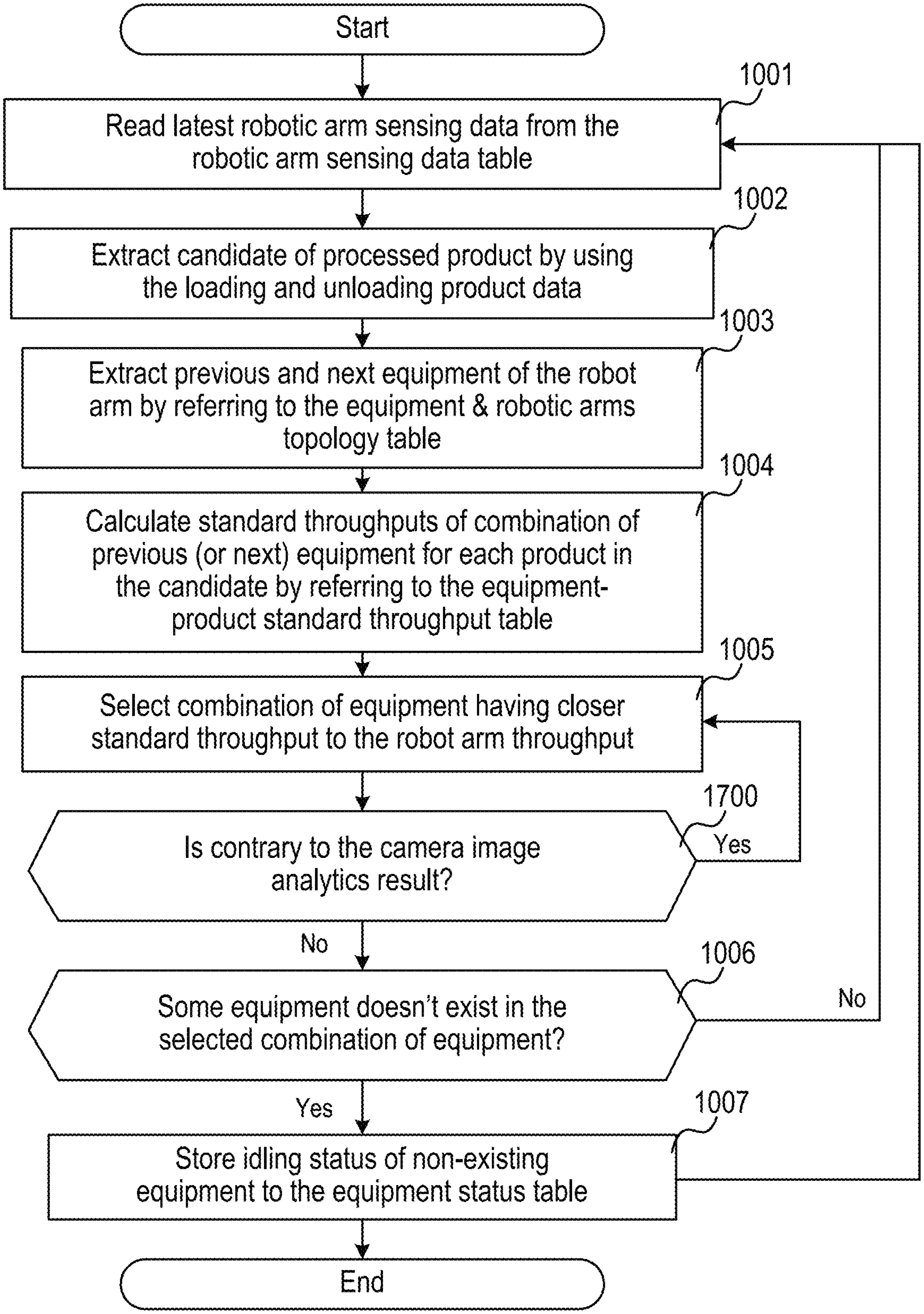
FIG. 17 illustrates the flow chart of camera utilization equipment status estimation module, in accordance with a second example implementation.

FIG. 17 illustrates the flow chart of camera utilization equipment status estimation module, in accordance with a second example implementation. The flow is equivalent to that of FIG. 11 of the first example implementation, only that there is an additional flow at 1700, wherein the resultant analytics for the combination of equipment and arm is compared to the analytics result produced by the camera analytics. If the results contradict each other (Yes) then the flow proceeds back to 1005 to select a different combination of equipment and arm, otherwise (No) the flow proceeds to 1006.

Figure 18:
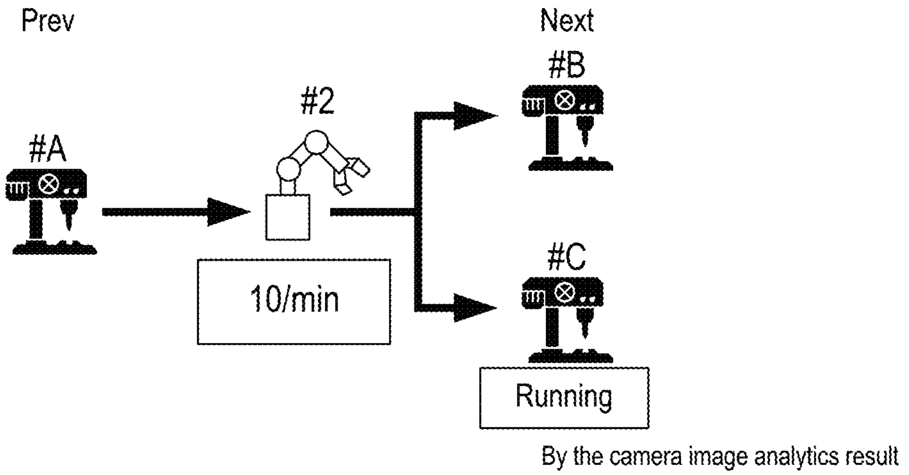
FIG. 18 illustrates an example description diagram of camera utilization equipment status estimation, in accordance with a second example implementation.

FIG. 18 illustrates an example description diagram of camera utilization equipment status estimation, in accordance with a second example implementation. In the example of FIG. 18, there is a branching configuration so that the previous equipment of robotic arm #2 is #A and next equipment are #B and #C, and the possible processing products are #x, #y. The module of FIG. 17 is utilized to calculate the robotic arm standard throughputs of each equipment set and product.

In this example, since the measured throughput of robotic arm #2 is 10/min, the robotic arm standard throughput of the equipment B and the product #x (11/min) is the closest throughput to the measured throughput. However, the camera image analytics results indicate that equipment #C is running, which indicates a contradiction. Thus, the combination of equipment #B and #C and the product #x, #y is selected because the robotic arm standard throughput (13/min) is the second closest entry to the measured throughput. In this example, the measured throughput of robotic arm #2 depends on the throughput of the equipment #B, #C and thus idling equipment is not detected.

Through this example implementation, the accuracy of equipment status estimation can be enhanced by using the sensors and analytics such as camera image analytics.

Third Example Implementation

This example implementation calculates robotic arm standard throughput per equipment combination and product in the offline environment (e.g., the factory floor). In the online environment, this example implementation compares the measured robotic arm throughput with the robotic arm standard throughput, and then estimates equipment status.

Figure 19:
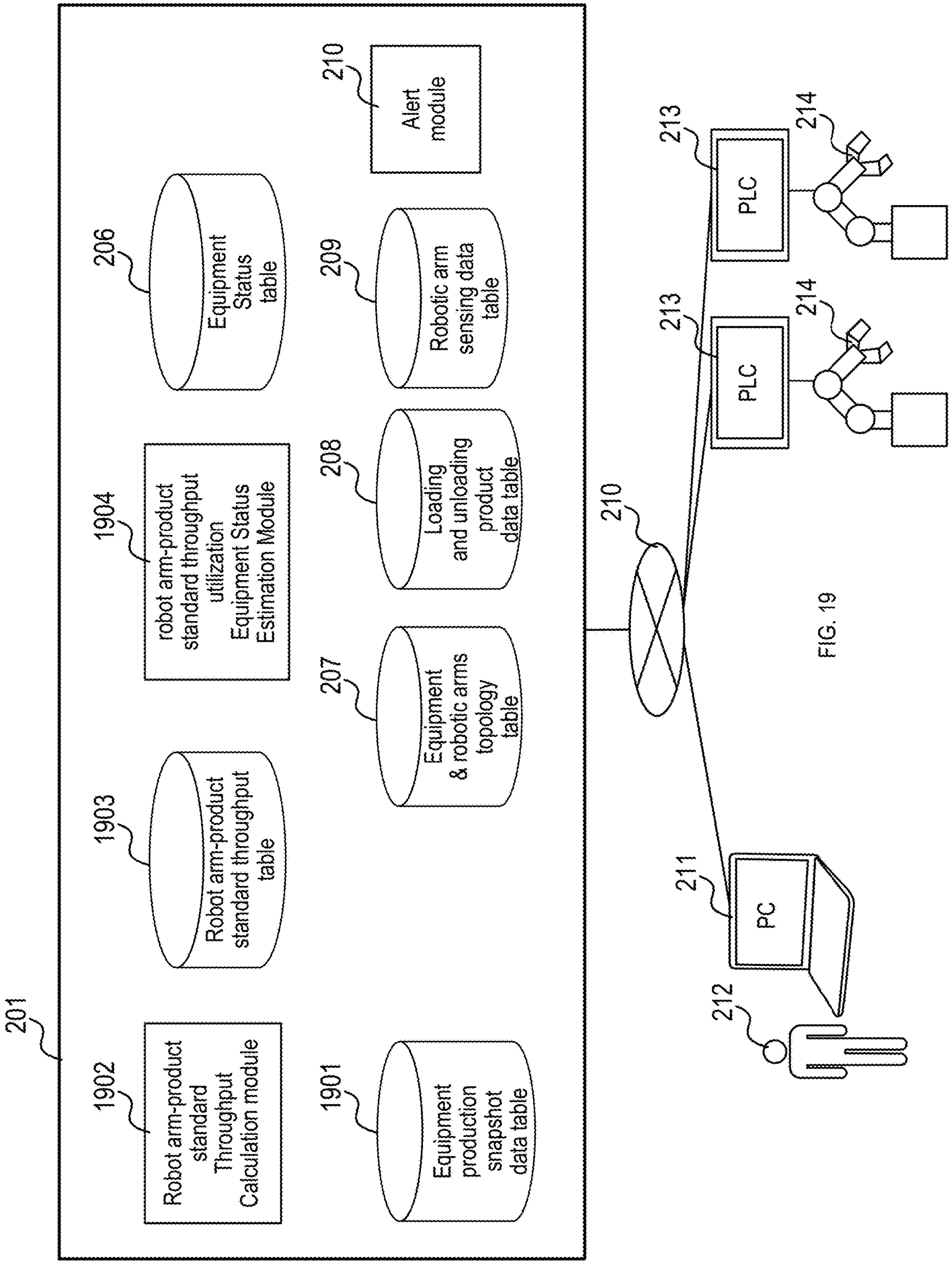
FIG. 19 illustrates an example system configuration, in accordance with a third example implementation.

FIG. 19 illustrates an example system configuration, in accordance with a third example implementation. The configuration is similar to that of the first example implementation, with the differences involving an equipment production snapshot data table 1901, a robot arm-product standard throughput calculation module 1902, a robot arm-product standard throughput table 1903, and robot arm-product standard throughput utilization equipment status estimation module 1904.

Figure 20:
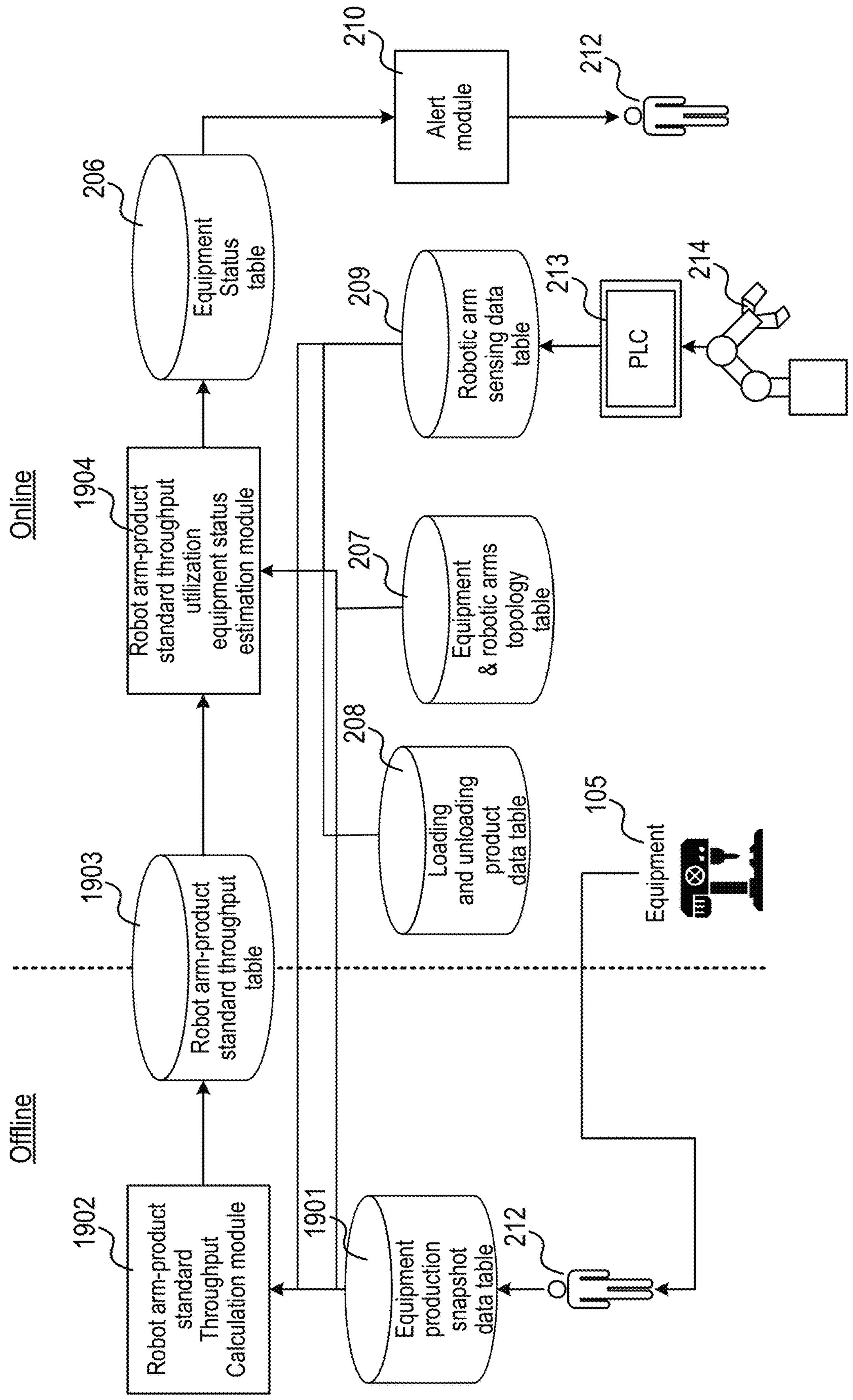
FIG. 20 illustrates the input and output relation of modules/tables, in accordance with a third example implementation.

FIG. 20 illustrates the input and output relation of modules/tables, in accordance with a third example implementation. The diagram is similar to that of FIG. 3 of the first example implementation, with the following differences. The equipment production snapshot data table 1901 will differ as shown in FIG. 21. Robotic arm sensing data table 209 also provides data for robot arm-product standard throughput calculation module 1902, which conducts the throughput calculation and provides the information to the robot arm-product standard throughput table 1903, which is utilized by robot arm-product standard throughput utilization equipment status estimation module 1904.

FIG. 21 illustrates an equipment production snapshot data table, in accordance with a third example implementation. The table stores information regarding whether each equipment is running or not, and which product each equipment processes at each time. Such data is registered by workers 212 on the offline environment. The information can include the time stamp 2100, the equipment ID 2101, the status of the equipment 2102, and the product ID 2103. Entries 2104, 2105, 2106, 2107, 2108 and 2109 illustrate examples of the equipment production snapshot. For example entry 2107 indicates that for a snapshot taken at 11:00 AM on Feb. 1, 2019, equipment #B was running and executing the process for product #y.

FIG. 22 illustrates the robotic arm-product standard throughput table, in accordance with a third example implementation. The table stores the values of standard robotic arm throughput for each previous and next running equipment combination and the processed products. The information can include the robotic arm ID 2201, the previously running equipment ID(s) 2202, the previous running equipment product ID(s) 2203, the next running equipment ID(s)

2204, the next running equipment products 2205, and the standard robot arm throughput 2206. Entries 2207, 2208, 2209, 2210, 2211, 2212, 2213, and 2214 illustrate examples of associating the standard robot arm throughput for a robot arm managed in the configuration involving the indicated previously running equipment and products, and the next running equipment and products. For example, entry 2207 indicates that for robotic arm #2, the previously running equipment in the topology is equipment #A processing product #x, the next running equipment ID is a branch to equipment #B and #C, which process product #x and #x, respectively. In this configuration, the robot arm throughput of robotic arm #2 is 17 units/minute.

Figure 23:
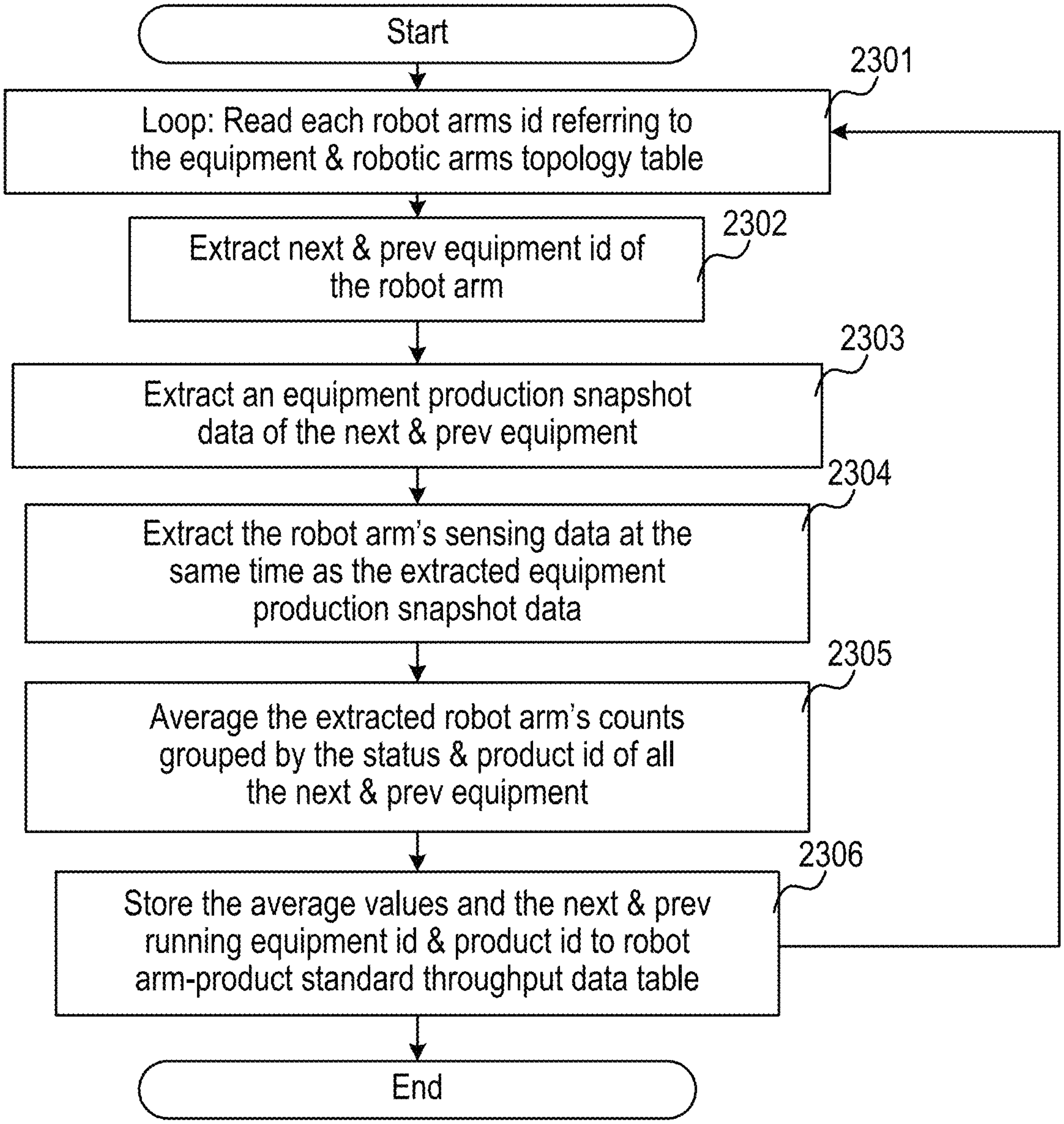
FIG. 23 illustrates an example flow diagram for the robot arm-product standard throughput calculation module, in accordance with a third example implementation.

FIG. 23 illustrates an example flow diagram for the robot arm-product standard throughput calculation module, in accordance with a third example implementation. At 2301, a loop is initiated wherein each of the robot arm ID(s) are read by referring to the equipment and robotic arms topology table. At 2302, for the entry, the next and previous equipment ID of the robot arm is extracted. At 2304, the robot arm sensing data is extracted at the same time as the extracted equipment production snapshot data. At 2305, an average of the extracted robot arm counts are grouped by the status and the product ID for all of the next and previous equipment. At 2306, the average values, the next and previous running equipment ID(s), and the product id(s) are stored in the robot arm-product standard throughput data table.

Figure 24:
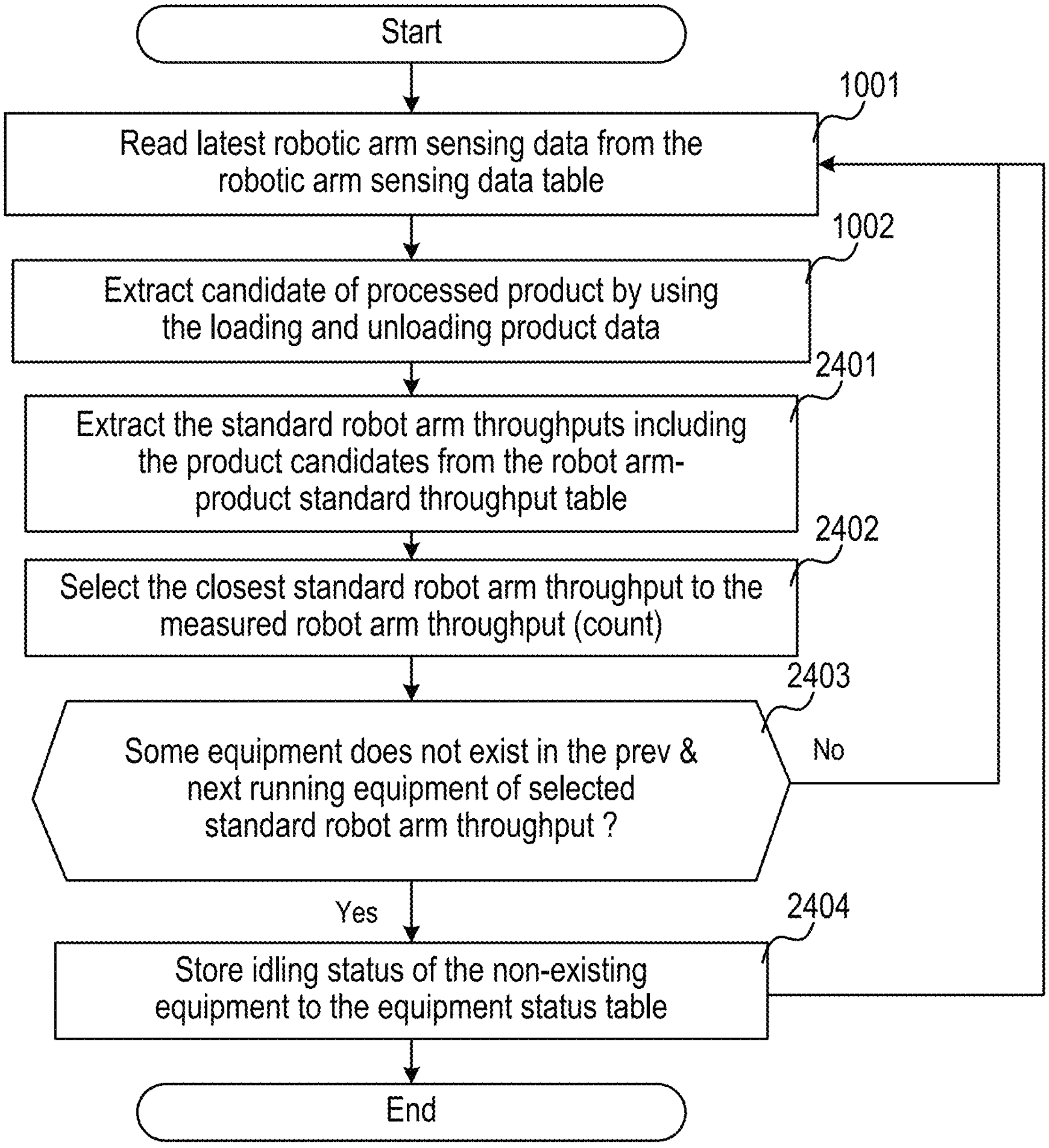
FIG. 24 illustrates an example flowchart of the robot arm-product standard throughput utilization equipment status estimation module, in accordance with a third example implementation.

FIG. 24 illustrates an example flowchart of the robot arm-product standard throughput utilization equipment status estimation module, in accordance with a third example implementation. The flow diagram is similar to that of FIG. 11, with the differences described herein. At 2401, the module extracts the standard robot arm throughputs including the product candidates from the robot arm-product standard throughput table. At 2402, the closest standard robot arm throughput to the measured robot arm throughput is selected. At 2403, a determination is made as to whether there is an equipment that does not exist in the previous and next running equipment of selected standard robot arm throughput by referring to the equipment & robotic arms topology table. If so (Yes) the flow proceeds to 2404, otherwise (No) the flow proceeds back to 1001.

This invention is used to monitor equipment's status, detect anomaly of equipment, and manage equipment in factories.

Figure 25:
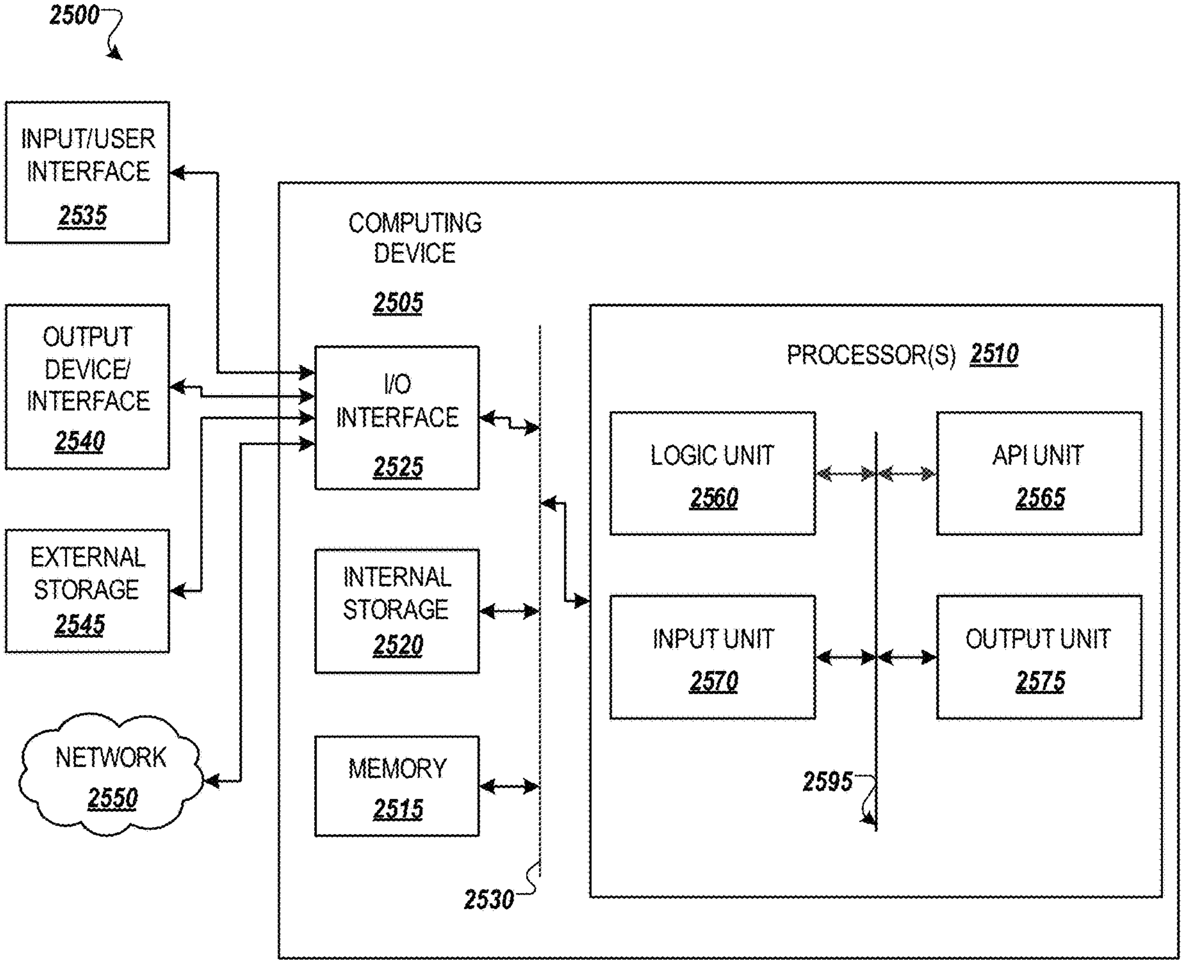
FIG. 25 illustrates an example computing environment with an example computer device suitable for use in some example implementations.

FIG. 25 illustrates an example computing environment with an example computer device suitable for use in some example implementations, such as a server or personal computer that facilitates the functionality of computer device 103 and the functionality of the diagrams as illustrated in FIGS. 2, 14, and 19. In such an example implementation, the computer device 103 is connected to one or more programmable logic controllers (PLCs) associated with a robotic arm over a network, and wherein equipment associated with the robotic arm is isolated from the network (i.e. offline as illustrated in FIGS. 3, 15 and 20).

Computer device 2505 in computing environment 2500 can include one or more processing units, cores, or processors 2510, memory 2515 (e.g., RAM, ROM, and/or the like), internal storage 2520 (e.g., magnetic, optical, solid state storage, and/or organic), and/or I/O interface 2525, any of which can be coupled on a communication mechanism or bus 2530 for communicating information or embedded in the computer device 2505. I/O interface 2525 is also configured to receive images from cameras or provide images to projectors or displays, depending on the desired implementation.

Computer device 2505 can be communicatively coupled to input/user interface 2535 and output device/interface 2540. Either one or both of input/user interface 2535 and output device/interface 2540 can be a wired or wireless interface and can be detachable. Input/user interface 2535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 2540 may include a display, television, monitor, printer, speaker, braille, or the like. In some example implementations, input/user interface 2535 and output device/interface 2540 can be embedded with or physically coupled to the computer device 2505. In other example implementations, other computer devices may function as or provide the functions of input/user interface 2535 and output device/interface 2540 for a computer device 2505.

Examples of computer device 2505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2505 can be communicatively coupled (e.g., via I/O interface 2525) to external storage 2545 and network 2550 for communicating with any number of networked components, devices, and systems, including one or more computer devices of the same or different configuration. Computer device 2505 or any connected computer device can be functioning as, providing services of, or referred to as a server, client, thin server, general machine, special-purpose machine, or another label.

I/O interface 2525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 2500. Network 2550 can be any network or combination of networks (e.g., the Internet, local area network, wide area network, a telephonic network, a cellular network, satellite network, and the like).

Computer device 2505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 2505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 2510 can execute under any operating system (OS) (not shown), in a native or virtual environment and can be in the form of physical hardware processors such as Central Processing Units (CPUs) or a combination of software and hardware processors. One or more applications can be deployed that include logic unit 2560, application programming interface (API) unit 2565, input unit 2570, output unit 2575, and inter-unit communication mechanism 2595 for the different units to communicate with each other, with the OS, and with other applications (not shown). The described units and elements can be varied in design, function, configuration, or implementation and are not limited to the descriptions provided.

In some example implementations, when information or an execution instruction is received by API unit 2565, it may be communicated to one or more other units (e.g., logic unit 2560, input unit 2570, output unit 2575). In some instances, logic unit 2560 may be configured to control the information flow among the units and direct the services provided by API unit 2565, input unit 2570, output unit 2575, in some example implementations described above. For example, the flow of one or more processes or implementations may be controlled by logic unit 2560 alone or in conjunction with API unit 2565. The input unit 2570 may be configured to obtain input for the calculations described in the example implementations, and the output unit 2575 may be configured to provide output based on the calculations described in example implementations.

Processor(s) 2510 can be configured to determine a throughput of a robotic arm based on the information from FIG. 8, determine an equipment and product pair from one or more equipment and product pairs associated with the robotic arm based on comparing the throughput to a standard throughput of the robotic arm for the one or more equipment and product pairs as illustrated in FIGS. 11-13, 17, 18 and 24; and identify idle equipment from the determined equipment and product pair and a topology of the robotic arm from the results therein. For example, if the determined equipment and product pair only indicates equipment B is paired with the product but the topology indicates that the robotic arm is associated with equipment B and C, then C is thereby determined to be idle.

Processor(s) 2510 can be configured to determine the equipment and product pair from the one or more equipment and product pairs associated with the robotic arm based on comparing the throughput to a standard throughput of the robotic arm for the one or more equipment and product pairs by selecting the equipment and product pair from the one or more equipment and product pairs having a closest value for the standard throughput of the robotic arm to the throughput of the robotic arm; wherein the processor is configured to identify idle equipment from the determined equipment and product pair and the topology of the robotic arm by, for a comparison of the determined equipment and product pair indicative of a missing equipment in comparison to the topology of the robotic arm, identifying the missing equipment as the idle equipment as illustrated in FIGS. 11-13.

Processor(s) 2510 can be further configured to, for image analytics indicative of the idle equipment being in a running state, determine another equipment and product pair from the one or more equipment and product pairs associated with the robotic arm; and identify another idle equipment from the determined another equipment and product pair and the topology of the robotic arm as illustrated in FIGS. 17 and 18.

Processor(s) 2510 can be configured to determine the equipment and product pair from the one or more equipment and product pairs associated with the robotic arm based on comparing the throughput to the standard throughput of the robotic arm for the one or more equipment and product pairs by selecting the equipment and product pair from the one or more equipment and product pairs having a closest value for the standard throughput of the robotic arm to the throughput of the robotic arm, the equipment and product pair comprising previously running equipment paired with first equipment products and next running equipment associated with the robotic arm paired with second equipment products; wherein the processor is configured to identify idle equipment from the determined equipment and product pair and the topology of the robotic arm by, for a comparison of the determined equipment and product pair indicative of a missing equipment in comparison to the topology of the robotic arm, identifying the missing equipment as the idle equipment as illustrated in FIG. 24.

In example implementations, the topology of the robotic arm is indicative of a configuration of equipment associated to the robotic arm in a merged configuration or a branched configuration as illustrated in FIGS. 12 and 18 for a branched configuration, and FIG. 13 for a merged configuration.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

determining a throughput of a robotic arm;

determining an equipment and product pair from one or more equipment and product a pairs associated with the robotic arm based on comparing the throughput to a standard throughput of the robotic arm for the one or more equipment and product pairs;

identifying idle equipment from the determined equipment and product pairs and a topology of the robotic arm; and identifying offline equipment from the determined equipment and product pair and the topology of the robotic arm, and alerting an offline status associated with the identified offline equipment.

2. The method of claim 1, wherein the determining the equipment and product pair from the one or more equipment and product pairs associated with the robotic arm based on comparing the throughput to a standard throughput of the robotic arm for the one or more equipment and product pairs comprises selecting the equipment and product pair from the one or more equipment and product pairs having a closest value for the standard throughput of the robotic arm to the throughput of the robotic arm;

wherein the identifying idle equipment from the determined equipment and product pair and the topology of the robotic arm comprises, for a comparison of the determined equipment and product pair indicative of a missing equipment in comparison to the topology of the robotic arm, identifying the missing equipment as the idle equipment.

3. The method of claim 1, further comprising, for sensors and analytics indicative of the idle equipment being in a running state, determining another equipment and product pair from the one or more equipment and product pairs associated with the robotic arm; and identifying another idle equipment from the determined another equipment and product pair and the topology of the robotic arm.

4. The method of claim 1, wherein the determining an equipment and product pair from one or more equipment and product pairs associated with the robotic arm based on comparing the throughput to the standard throughput of the robotic arm for the one or more equipment and product pairs comprises:

selecting the equipment and product pair from the one or more equipment and product pairs having a closest value for the standard throughput of the robotic arm to the throughput of the robotic arm, the equipment and product pair comprising previously running equipment paired with first equipment products and next running equipment associated with the robotic arm paired with second equipment products;

wherein the identifying idle equipment from the determined equipment and product pair and the topology of the robotic arm comprises, for a comparison of the determined equipment and product pair indicative of a missing equipment in comparison to the topology of the robotic arm, identifying the missing equipment as the idle equipment.

5. The method of claim 1, wherein the topology of the robotic arm is indicative of a configuration of equipment associated to the robotic arm in a merged configuration or a branched configuration.

6. The method of claim 1, wherein the method is performed by a server connected to one or more programmable logic controllers (PLCs) associated with the robotic arm over a network, and wherein equipment associated with the robotic arm is isolated from the network.

7. A non-transitory computer readable medium, storing instructions for executing a process, the instructions comprising:

determining a throughput of a robotic arm;

determining an equipment and product pair from one or more equipment and product pairs associated with the robotic arm based on comparing the throughput to a standard throughput of the robotic arm for the one or more equipment and product pairs;

identifying idle equipment from the determined equipment and product pair and a topology of the robotic arm; and identifying offline equipment from the determined equipment and product pair and the topology of the robotic arm, and alerting an offline status associated with the identified offline equipment.

8. The non-transitory computer readable medium of claim 7, wherein the determining the equipment and product pair from the one or more equipment and product pairs associated with the robotic arm based on comparing the throughput to a standard throughput of the robotic arm for the one or more equipment and product pairs comprises selecting the equipment and product pair from the one or more equipment and product pairs having a closest value for the standard throughput of the robotic arm to the throughput of the robotic arm;

wherein the identifying idle equipment from the determined equipment and product pair and the topology of the robotic arm comprises, for a comparison of the determined equipment and product pair indicative of a missing equipment in comparison to the topology of the robotic arm, identifying the missing equipment as the idle equipment.

9. The non-transitory computer readable medium of claim 7, further comprising, for sensors and analytics indicative of the idle equipment being in a running state, determining another equipment and product pair from the one or more equipment and product pairs associated with the robotic arm; and identifying another idle equipment from the determined another equipment and product pair and the topology of the robotic arm.

10. The non-transitory computer readable medium of claim 7, wherein the determining an equipment and product pair from one or more equipment and product pairs associated with the robotic arm based on comparing the throughput to the standard throughput of the robotic arm for the one or more equipment and product pairs comprises:

selecting the equipment and product pair from the one or more equipment and product pairs having a closest value for the standard throughput of the robotic arm to the throughput of the robotic arm, the equipment and product pair comprising previously running equipment paired with first equipment products and next running equipment associated with the robotic arm paired with second equipment products;

wherein the identifying idle equipment from the determined equipment and product pair and the topology of the robotic arm comprises, for a comparison of the determined equipment and product pair indicative of a missing equipment in comparison to the topology of the robotic arm, identifying the missing equipment as the idle equipment.

11. The non-transitory computer readable medium of claim 7, wherein the topology of the robotic arm is indicative of a configuration of equipment associated to the robotic arm in a merged configuration or a branched configuration.

12. The non-transitory computer readable medium of claim 7, wherein the process is executed on a server connected to one or more programmable logic controllers (PLCs) associated with the robotic arm over a network, and wherein equipment associated with the robotic arm is isolated from the network.

13. A server connected to one or more programmable logic controllers (PLCs) associated with a robotic arm over a network, and wherein equipment associated with the robotic arm is isolated from the network, the server comprising:

a processor, configured to:

determine a throughput of a robotic arm;

determine an equipment and product pair from one or more equipment and product pairs associated with the robotic arm based on comparing the throughput to a standard throughput of the robotic arm for the one or more equipment and product pairs;

identify idle equipment from the determined equipment and product pair and a topology of the robotic arm; and identify offline equipment from the determined equipment and product pair and the topology of the robotic arm, and alert an offline status associated with the identified offline equipment.

14. The server of claim 13, wherein the processor is configured to determine the equipment and product pair from the one or more equipment and product pairs associated with the robotic arm based on comparing the throughput to a standard throughput of the robotic arm for the one or more equipment and product pairs by selecting the equipment and product pair from the one or more equipment and product pairs having a closest value for the standard throughput of the robotic arm to the throughput of the robotic arm;

wherein the processor is configured to identify idle equipment from the determined equipment and product pair and the topology of the robotic arm by, for a comparison of the determined equipment and product pair indicative of a missing equipment in comparison to the topology of the robotic arm, identifying the missing equipment as the idle equipment.

15. The server of claim 13, the processor further configured to, for sensors and analytics indicative of the idle equipment being in a running state, determine another equipment and product pair from the one or more equipment and product pairs associated with the robotic arm; and identify another idle equipment from the determined another equipment and product pair and the topology of the robotic arm.

16. The server of claim 13, wherein the processor is configured to determine the equipment and product pair from the one or more equipment and product pairs associated with the robotic arm based on comparing the throughput to the standard throughput of the robotic arm for the one or more equipment and product pairs by:

selecting the equipment and product pair from the one or more equipment and product pairs having a closest value for the standard throughput of the robotic arm to the throughput of the robotic arm, the equipment and product pair comprising previously running equipment paired with first equipment products and next running equipment associated with the robotic arm paired with second equipment products;

wherein the processor is configured to identify idle equipment from the determined equipment and product pair and the topology of the robotic arm by, for a comparison of the determined equipment and product pair indicative of a missing equipment in comparison to the topology of the robotic arm, identifying the missing equipment as the idle equipment.

17. The server of claim 13, wherein the topology of the robotic arm is indicative of a configuration of equipment associated to the robotic arm in a merged configuration or a branched configuration.

* * * * *